United States Patent
Katraro et al.

[11] Patent Number: 6,077,376
[45] Date of Patent: *Jun. 20, 2000

[54] PROCESS FOR PRODUCING A TUBULAR MEMBRANE ASSEMBLY

[75] Inventors: Reuven Katraro, Rishon Letzion; Charles Linder, Rehovot; Mara Nemas, Gedera, all of Israel

[73] Assignee: Membrane Products Kiryat Weizman Ltd., Israel

[ * ] Notice: This patent issued on a continued prosecution application filed under 37 CFR 1.53(d), and is subject to the twenty year patent term provisions of 35 U.S.C. 154(a)(2).

[21] Appl. No.: 08/954,938

[22] Filed: Oct. 22, 1997

[51] Int. Cl.⁷ ............................ B65H 81/00; B01D 69/10
[52] U.S. Cl. ............................................. 156/195; 156/184
[58] Field of Search ................................... 156/195, 184, 156/191, 194

[56] References Cited

U.S. PATENT DOCUMENTS

| | | |
|---|---|---|
| 3,601,159 | 8/1971 | Marks ................................. 156/145 X |
| 3,746,591 | 7/1973 | Banfield . |
| 3,769,128 | 10/1973 | Manjikian . |
| 3,804,259 | 4/1974 | Riggleman et al. . |
| 4,010,054 | 3/1977 | Bradt . |
| 4,214,612 | 7/1980 | de Putter . |
| 4,259,183 | 3/1981 | Cadotte . |
| 4,427,485 | 1/1984 | Kutnyak et al. . |
| 4,544,435 | 10/1985 | Hawerkamp . |
| 4,690,765 | 9/1987 | Linder et al. . |
| 4,690,766 | 9/1987 | Linder et al. . |
| 4,767,645 | 8/1988 | Linder et al. . |
| 4,788,596 | 11/1988 | Kawakami et al. . |
| 4,833,014 | 5/1989 | Linder et al. . |
| 4,838,971 | 6/1989 | Cacak . |
| 4,906,379 | 3/1990 | Hodgins et al. . |
| 5,024,765 | 6/1991 | Linder et al. . |
| 5,039,421 | 8/1991 | Linder et al. . |
| 5,049,282 | 9/1991 | Linder et al. . |
| 5,151,182 | 9/1992 | Perry et al. . |
| 5,205,934 | 4/1993 | Linder et al. . |
| 5,256,230 | 10/1993 | Winkel . |
| 5,264,162 | 11/1993 | Salem et al. . |
| 5,468,207 | 11/1995 | Bower et al. . |
| 5,827,430 | 10/1998 | Perry, Jr. et al. ................... 156/195 X |

FOREIGN PATENT DOCUMENTS

| | | |
|---|---|---|
| 1434071 | 4/1976 | France . |
| 1325672 | 8/1973 | United Kingdom . |
| 2164115 | 3/1986 | United Kingdom . |

OTHER PUBLICATIONS

WPI Abstract Acc No. 87–201925 & JP62–129108A (Nitto Electric).

Primary Examiner—Jeff H. Aftergut
Attorney, Agent, or Firm—Laubscher & Laubscher

[57] ABSTRACT

The invention provides a process for producing a tubular membrane assembly comprising helically winding at least one strip of fibrous material on a mandrel to produce at least a single ply tubular support member for a semi-permeable membrane, characterized by passing the strip through a heated section of the mandrel during the helical winding thereof to flatten and smooth fibers protruding along the cross-sectional width of the strip, whereby a tube with a smooth inner bore along its entire length is formed.

9 Claims, 1 Drawing Sheet

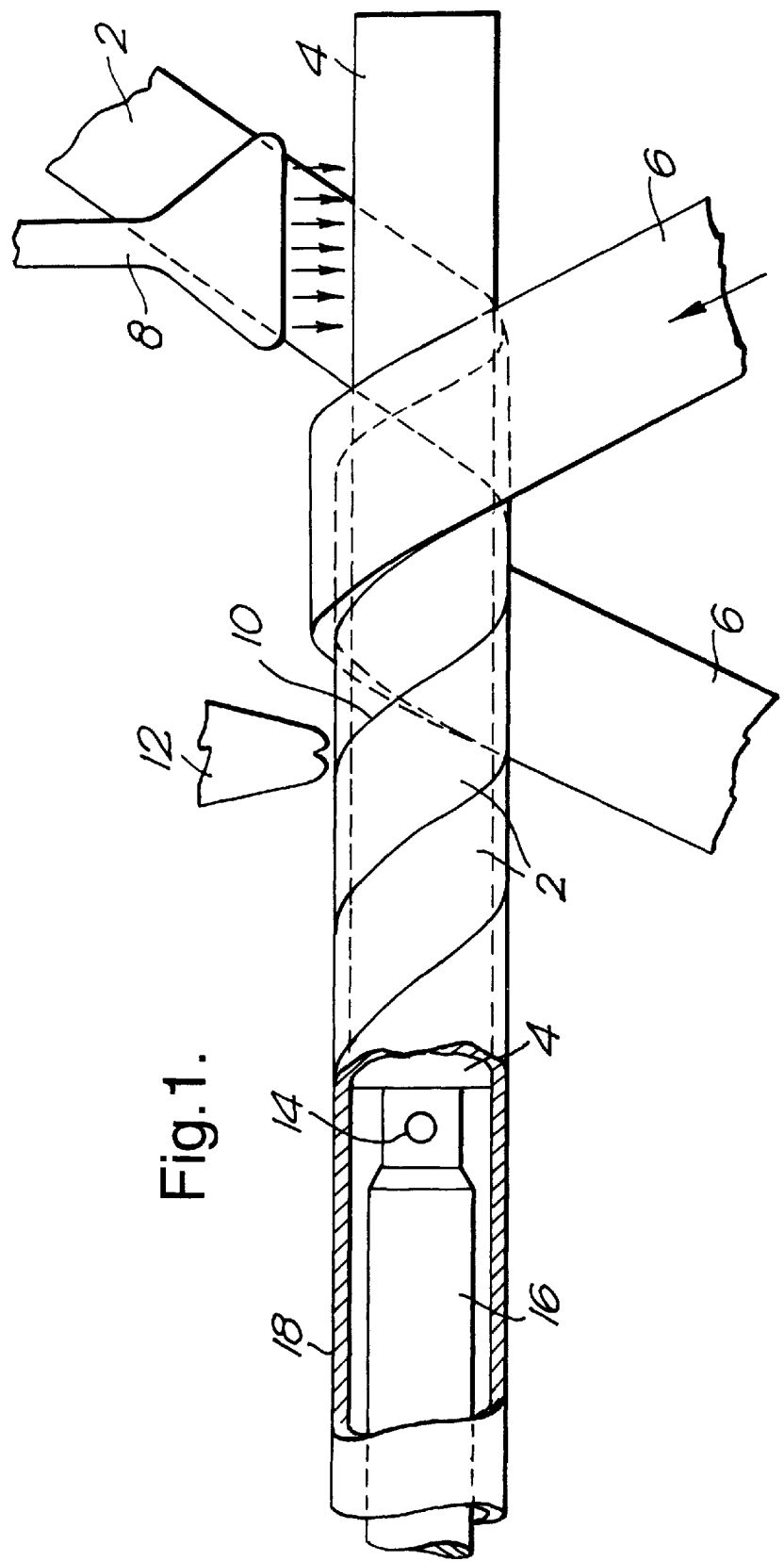

PROCESS FOR PRODUCING A TUBULAR MEMBRANE ASSEMBLY

BACKGROUND OF THE INVENTION

The present invention relates to a process for producing a tubular membrane assembly and tubular membrane assemblies produced thereby.

More particularly, the present invention relates to a process for producing tubular support members for semipermeable membranes.

BRIEF DESCRIPTION OF THE PRIOR ART

Methods and apparatus for producing a membrane assembly are already known and described, e.g., in GB 1,325,673 which describes winding of multiply porous tubes, sealing at least the overlap portions on one tape and GB 1,325,672 (Jul. 16, 1969), which describes winding of multi-ply porous tubes followed by continuous casting a liquid dope to give a semi-permeable membrane onto the inside of the formed tube. The sealing of the overlap portions may be done by heat melting and fusion of the overlap portions or by adhesives. In addition, if more than one ply is used the plies are adhered together by thermoplastic dots distributed over a minor area of one of the nonwoven and then heated to adhere the two plies.

It is further stated in the above patents that the ply on which the membrane is cast may be treated with modifiers to render the surface properties suitable for application of a membrane. Such modifiers will modify the surface roughness and the interfacial tension when the dope is applied.

It is further described in the above patents that a heating step of the inner surface of a nonwoven band prior to winding is possible but in this case it is done in the formation of a two ply tube, where the outer band of nonwoven material is passed over a heater, prior to winding. The inner band of nonwoven material is not passed over a heater, prior to winding. The objective of this heating step is to make tacky a previously applied hot melt adhesive which is used to adhere the two plies to each other.

U.S. Pat. No. 4,214,612 which is entitled, "Tube of nonwoven material for reverse osmosis (RO)" and Israeli patent 43500 which is entitled, "Method of Manufacturing a Tube of nonwoven material for reverse osmosis" (both assigned to Wavin B. V.), are also part of the state of the arts. The US patent describes a tube of nonwoven material having fixed on the inner wall thereof a membrane for membrane filtration, where the tube comprises a helical wound nonwoven band of heat sealable synthetic fibers with edges thereof positioned in overlapping relationship, and providing overlapping portions being uniformly heated on their entire thickness and width with by ultrasonic sealing vibrations, so as to completely heat seal the overlapping parts and along their edges to avoid the formation of sharp and fibrous portions of extending fibrous ends within the innerside of the tube so that a smooth inner wall is obtained and to obtain a very uniform inner diameter minimizing damage to the membrane within the inner side of the tube.

The Israeli patent is more general and has two independent claims:

1.) A tube of nonwoven material for supporting a membrane consisting of a band of a sealable synthetic fiber of a nonwoven material, said tube being made by consecutive overlapping or contiguous windings of the band which are interconnected by heat seals, wherein at least the edge of a winding which is situated under or continuous with another winding is connected with the other winding by ultrasonic sealing.

2.) A method for manufacturing a tube of nonwoven material for supporting a membrane formed from of a band of sealable synthetic fiber of a nonwoven material, said tube being made by consecutive overlapping or contiguous windings of the band which are interconnected by heat seals, wherein at least the free edge are of a winding which is situated under or continuous with another winding is connected with the other winding by ultrasonic sealing.

In the above patents, mention is made of the process of fusing the overlap areas by ultrasonic sealing or heating, and this process results in a smooth inner wall. In these patents the term "a smooth inner wall" refers only to the overlap portion, which is only a small area of the membrane supporting tube.

The state of the art also includes processes in which a band or bands of nonwoven materials of a given width are wound continuously by means of a flexible belt, on winding machine having a mandrel. Such winding machines are well known to those versed in the state of art. If the membrane is cast continuously as the tube is formed, then the far end of the mandrel contains a distributor and bob through which the polymer solution which forms the membrane is extruded onto the inner surface of the wound tube at a width determined by the clearance between the bob and the inner surface of the formed tube. The mandrel (made of stainless steel for example) may be of such a diameter to form tubes having diameters from 5 mm to 1250 mm, but preferably between 6 to 25 mm. The rate of casting the membrane and supply of casting solution should be equal so as not to have a build-up or a depletion of casting solution.

In addition, a tube forming system and membrane casting system are described in GB 1,325,672, as mentioned hereinbefore. In particular the mandrel section contains two hollow concentric tubes. The inner lumen of the central tube is used to pump the casting solution to the end of the mandrel where a polymer solution is extruded to form the membrane. The other channel in the concentric tube arrangement is used for passing a cooling material (for example cooled water) to control the temperature of the casting solution and reduce the temperature caused by frictional drag of the tube along the mandrel section. In the final step involving the process of tube formation and the casting of a membrane inside this tube, the tube is cut and immersed in water (preferably cold) to gel the liquid polymer film deposited on the inner portion of the nonwoven, thus forming a solid asymmetric membrane.

Furthermore, the membrane may be symmetric but it is preferable asymmetric. The asymmetric membrane may be micro filter (MF) or ultra filter (UF) or a coated UF or MF which is either a tighter UF or a nano filter (NF) or a reverse osmosis (RO) membrane.

In order to mechanically strengthen tubes, especially one ply tubes, these tubes may be wound on the external surface with one or more reinforcing filaments or tapes which are conveniently at least partially sealed to the nonwoven tube. These filaments or tapes are preferably made of thermoplastic materials. Glass filaments may also be used.

The tubes are made continuous and then cut to size. The cut tubes may have lengths varying between 10 cm to 10 meters. preferred lengths are between 60 cm and 4.0 meters. Some preferred lengths are 60 cm, 120 cm and 3.6 meters.

The tube may have an outer diameter between 0.5 to 10 cm. A preferred diameter is between 1.0 to 2.0 cm.

The tubes may stand without further support in a module, or if high pressure is used they may be supported in a cylindrical porous support made from material such as stainless steel or engineering plastics such as polysulfone or carbon composites. The porosity in these support tubes is usually achieved by drilling small holes along its length.

Some examples of heat sealing and heat fusing equipment are electrical heating, high frequency waves and ultrasonic waves.

For pH and temperature stable membranes the UF support upon which NF and RO may be, for example, made are based on aromatic polysufone, polyether sulfones, polyether ketone, polyaryl polysulfones, polyether ether ketones and polyfluropolymers. The NF or RO membranes may be made according to the following patents which are incorporated herein by reference. They are U.S. Pat. Nos. 4,690,765, 4,690,766, 4,788,596, 4,767,645, 4,833,014, 5,024,765, and 5,049,282.

Solvent stable supports which may be MF or UF and NF or RO membranes made on solvent stable supports, are also included in this patent by reference to the following patent: U.S. Pat. No. 5,028,337 (solvent stable supports), U.S. Pat. Nos. 4,906,379, 5,039,421, 5,205,934, 5,151,182. An example of a solvent stable membrane is a crosslinked asymmetric UF membrane based on polyacrylonitrile which has been crosslinked by base and heat treatment.

NF and RO membrane without exceptional pH and chemical stability are also included within this patent. Such membranes are included by reference to the following patents:
U.S. Pat. Nos. 4,767,645, 4,833,014, 4,259,183.

The process of casting a membrane within the tube, as the tube is continuously formed is through a piston or cylindrical bob which is part of the mandrel upon which the tubular membrane is formed. This piston is at a slight clearance of the formed tube, is concentrically arranged within the nonwoven tube. The end of the piston has an opening through which the membrane casting solution emerges and coats the tube. When the tube moves relative to the piston the membrane is framed between the outer side of the piston and the inner side of the tube.

All the above patents of the state of art are included within the present invention by reference both from the aspect of the resultant tubular membranes and the equipment and process used to make these tubular membranes. In effect tubular membranes can be made as they are described on the equipment claimed within the mentioned patents, with the addition of the present inventive step-application of heat and pressure to smooth out the inner surface of a band of nonwoven material after it has been wound.

In JP 62129108 there are described tubular supports used in membrane manufacturing which are made by winding thermo adhesive fabric around a core, winding a second tape covering the edges of the first tape and sealing the edges by heating to melt a portion of the tape. For example a polypropylene/polyethylene fabric tube (width 2.8 cm, 70 microns thick) was wound around a core (diam. 12.0 mm). A similar tape (width 2.8 cm, 150 microns thick) was wound over first tube in a similar way and heated to 160° C. The inside of the prepared tubular support was coated with a polymer solution which was gelled in water and formed an asymmetric membrane. The tubular membrane withstood repeated pressurization with no separation of the laminate.

In the above process no mention is made with regards to the smoothing of the inner surface of the tubular support upon which the membrane is cast, by a process of heat and pressure on the support tape or band in the curled or wound state.

In patent JP 6201412 there is described a heat treatment which is done on the flat support by exposing the surface upon which the membrane will be cast to a heat source, such as a hot plate at 120° C. to 500° C. This process eliminates pin holes on the final membrane. An example: Thus, below 5 mm to the surface of a hot plate at 160° C. a polyester nonwoven fabric was passed at 3.5 m/min and then coated with a dope containing a polymer. Pin holes on the membrane tested by a color dye were totally eliminated by the heat treatment.

According to the present invention this process can not be used to make tubular membranes because this treatment is not carried out in the curled or wound state. In the process of curling the flattened fibers would again protrude even after the aforementioned treatment.

SUMMARY OF THE INVENTION

The present invention is concerned with solving the problem of pin holes due to protruding fibers. In effect the band of material wound and sealed into a tubular configuration is composed of fibers, which give a rough surface or point out from the surface in such a way that they form pin holes in the final MF or UF or NF or RO membranes made on the support, and in this way reduce the selectivity of the membrane.

To overcome pin holes the state of the art realizes that a heat or pressure, or heat and pressure step prior to winding can be carried out. In all of the state of the art cases however this is done for making flat membranes or on flat bands of support materials before they are curled or helically wound. This however, is not sufficient to prevent the formation of pin holes by protruding fibers in many cases when the nonwoven is made of polyolefins such as PP or PE or PP/PE. The problem arises in the curling process wherein the process of curling fibers are bent out of the surface even in previously calendared or flattened bands of material.

The problem of protruding fibers and pin holes is especially difficult to control when single ply tubes with good chemical and heat stability are desired to make chemical and heat stable UF, NF and RO membranes. To achieve a single ply the nonwoven must be relatively thick to have the desired stiffness. If relatively thick nonwovens are used the porosity should be high, which means the density of fibers should be kept low in order to have a high water flux. In such cases of thick open supports there are many protruding fibers, and the methods of the current state of art have not been able to achieve pin hole free membranes with such materials even with a precalendaring of the flat surfaces of the band materials prior to winding.

The objective of the present invention is to overcome the above mentioned problems. The present inventors have found that applying pressure and heat on the helically wound band after it has been wound, flattens or smoothes out protruding fibers such that the fibers are no longer protruding in sufficient concentration or directions and thus minimize significantly the problem of pin holes.

Thus according to the present invention there is provided a process of producing a tubular membrane assembly comprising helically winding at least one strip of fibrous material on a mandrel to produce at least a single ply tubular support member for a semi-permeable membrane, characterized by passing said strip through a heated section of said mandrel during the helical winding thereof to flatten and smooth fibers protruding along the cross-sectional width of said strip, whereby a tube with a smooth inner bore along its entire length is formed.

The present invention further provides a process wherein said tube is formed by helically winding said strip of nonwoven material in such a way as to have edges which are at least adjacent, and connecting and heat sealing said adjacent edges by a method selected from the group consisting of ultrasonic sealing, heating and fusing to form said tubular support.

The present invention also provides a process for producing a multiply tubular support member comprising forming a first inner tube from a strip of nonwoven material having non-overlapping edges, and then helically winding a further strip of nonwoven fibrous material in such a way as to have at least adjacent edges, and connecting and heat sealing said at least adjacent edges of said further strip to form a second outer tubular support member, and connecting said first inner tube to said second outer tube.

In a preferred embodiment of the present invention, the above-mentioned heat is applied by a hot air gun.

In another preferred embodiment of the present invention, the above-mentioned heat is applied by ultrasonic means, such IR radiation or other energy transporting means.

In a further preferred embodiment of the present invention, the above-mentioned heat is applied by electrical means.

In the preferred case a single ply tube is made with a single band of porous nonwoven material which is preferably a polyolefin, polypropylene, or a mixture thereof. To have sufficient mechanical rigidity so that the tube may be inserted and withdrawn from cylindrical support tubes, the nonwoven material should have a thickness of at least between 0.3 to 0.8 mm. If the thickness is 0.5 mm the permeability, as characterized by air permeability, should be 87 dm3/s.m2 at 2 mbar. An example of this support is produced by Carl Freudenberg Co., Germany, under the name of Viledon-Nonwovens for reverse osmosis and ultrafiltration. One preferable grade is FO 2435/V28210.

Thinner nonwoven material may be used, but they have to be reinforced, either by a second play which has to be interconnected to the first play by adhesive dots, which reduces the permeability, or by reinforcing tapes or filaments. In any case, when more than one ply is used it increases the complexity and cost of manufacturing and reduces the flux of the final membrane system.

If thicker nonwovens are used, the permeability must be increased as thickness increases water or solvent flow resistance. While the final tube must have mechanical strength and a certain degree of rigidity for handling, it must have some flexibility for winding. Thus, while nonwoven thickness cannot be too thick, it also should not be too thin. The optimum is given above for the preferred case, but the present invention is not limited to the currently preferred case.

Examples of other commercially available nonwovens are:

Hollytex (Ahlstrom Filtration Inc.,), based on polyester.
Tyvek-Spun bond polyolefins from DuPont Co.
Awa PP/PE nonwovens
Carl Freudenberg nonwovens based on polyester, PP or PP/PE The fibers of the overlap areas from each band are preferably fused into each other. Partial fusion of the fibers closer to the interface of both bands may be fused to each other, but this is less preferred as the fusion bond is weaker.

The width of the overlapping bands and the width of the sealed portions of the overlapping band may vary to complete sealing of the whole overlap area to only a portion. Thus, the fused area may be between 100% to 5%. The width of the overlapped edges and the fused width of the overlapping areas may vary between 0.1 to 5 mm, but preferably should be between 0.4 to 2.0 mm.

In U.S. Pat. No. 3,746,591 there is described a method of making a semipermeable membrane tube. This patent relates to spiral winding a porous fibrous tape into a tube to form a ply in which the overlap portions of the tape are sealed to itself by heat or solvent sealing. Also (column 2, lines 29–34), the surface of the tape may be treated before or after by winding with a modifying agent to render the surface more acceptable to the membrane by altering surface roughness and the interfacial tension between the surface and the membrane.

In the present invention a heat pretreatment, and not a modifying agent, is used to flatten protruding fibers, and is carried out specifically in the curled state just prior to complete winding and sealing. If this was done in the flat configuration, prior to curling, the fibers would come up after the curling. Performing flattening after the tube is formed, prior to casting into the tube in a continuous manner, is difficult to carry out.

In U.S. Pat. No. 3,769,128 there is described a method of producing semipermeable membrane elements. This patent relates to production of tubular membranes which is accomplished by helically winding a semipermeable strip around a permeable core while the membrane strip is wet and sealing contiguous edges of the wound membrane strip with a water soluble composition, or by wrapping a pressure sensitive adhesive around the edges under tension. This patent does not teach or suggest the present invention inter alia, because the present invention is concerned with winding porous nonwoven tubes into which a membrane is afterwards cast.

In U.S. Pat. No. 5,256,230 there is described the winding of resin impregnated fibers using a heated guide. This patent relates to a method and apparatus for winding resin impregnated fibers upon a mandrel, wherein a heated guide is employed to assist in the winding operation. This patent is different from the present invention and does not teach or suggest the same. In this patent there is described winding resin impregnated fibers and it does not describe porous supports for membranes. In the present invention, however, there is described winding strips of nonwoven material to make porous supports for membranes. Furthermore, the present invention utilizes a step of heating in the curled state to flatten the protruding fibers. Heating in the flat state prior to curling does not prevent the fibers from "Popping up" when curled.

Thus, none of said prior art publications teach or suggest the novel process of the present invention.

BRIEF DESCRIPTION OF THE FIGURE

The invention will now be described in connection with certain preferred embodiments with reference to the following examples and the appended illustrative FIGURE which is a plan view of a mandrel for forming a tubular membrane assembly.

DETAILED DESCRIPTION

With specific reference now to the FIGURE in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawing making apparent to those skilled in the art how the several forms of the invention may be embodied in practice.

EXAMPLE 1

As illustrated in FIG. 1, tubular membranes consisting of a thermoplastic nonwoven material have been wound into a tube by winding a band of nonwoven material 2, on a mandrel 4, using a flexible belt system 6, which winds and moves the band in the forward direction, applying heat by a hot air gun 8, and pressure due to tension in winding to the band in the curled state to flatten and smooth protruding fibers along the inner surface of the nonwoven material in order to form a smooth inner bore along the entire tube, then fusing the overlapping edges of the band 10, by a heat fusion or melting method such as ultrasonic sealing 12, which has been wound into a tube, to give a permanent robust tubular structure; continuously casting an MF or UF membrane on the inner tubular structure as the tube is formed by means of an extrusion port 14, and bob 16, placed concentrically in the just wound tube 18, or in a separate batch type process after the tube is formed and cut to size.

As illustrated and demonstrated in FIG. 1, the present invention teaches a heating and pressure application to flatten and smooth the inner surface of the nonwoven material while it is in the curled state, just prior to, or during the fusing or heat sealing of the overlapping edges.

EXAMPLE 2

A 27 mm wide, 0.5 mm thick band of the mixed polyolefinic nonwoven material, Viledon FO 2435, was wound on a mandrel having a diameter of 12.8 mm. The nonwoven material is wound on the mandrel with an overlap of the edges of 2 mm at a speed of 25 mm/sec. At the point of contact with the mandrel, the nonwoven material is heated to 120 C with a hot area gun. The area of heating is over a width of 29 mm of the wound band. At this point of heating, pressure on the nonwoven material is generated by the tension applied to the nonwoven band by the winding belt. This pressure is estimated to be approximately 10 bars. At the first overlap point further down the mandrel the overlap areas of the tube are heat sealed with an ultrasonic welder.

A membrane casting dope of 25% Udel 1700 polysulfone and 5% zinc chloride in 70% NMP is pumped through the inner tube of the mandrel (7.0 mm diameter) at 5 bars. Through the outer second channel formed between the inner and outer tubes of the mandrel, water is flowing at a temperature of 20° C. to cool the casting solution. This casting solution is extruded through the holes in the casting bob attached to the end of the mandrel and coats the inner surface of the tube. As the tube passes the clearance between the bob and the tube a wet film thickness of 0.3 mm is formed. The resulting tube coated on the inside is fed into a bath of cold water which gels the membrane. Before entering the bath the tube is cut by a diamond saw to a prescribed length of 3.6 meters. After standing in the bath for 24 hrs., the tubular membrane is removed and placed in a bath of water for 48 hours to rinse out the residual solvents.

The resultant membranes were tested with a high molecular weight dye to determine the number of pin holes. Over an area of 1 $m^2$ not more than 5 pin holes were observed.

EXAMPLE 3

Example 2 is repeated with the difference being that the heating step of the wound nonwoven material prior to the ultrasonic sealing is not carried out. The resultant tubular membrane had 540 pin holes over an area of 1.0 $m^2$. This indicates the importance of the heating step.

EXAMPLE 4

Example 2 is again repeated with the difference being that the heating step is applied to the flat, nonwoven material before it was wound. The resulting membrane had 210 pin holes over 1.0 $m^2$ of membrane area. This indicates the importance of heating the nonwoven material in wound or curled state.

It will be evident to those skilled in the art that the invention is not limited to the details of the foregoing illustrative examples and the attached FIGURE, and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A process for producing a tubular membrane assembly, comprising the steps of
   (a) helically winding at least one strip of fibrous material on a mandrel;
   (b) heating adjacent surface portions of said strip and mandrel at the point of contact with the mandrel as said strip is wound in a curled state on the mandrel;
   (c) simultaneously applying pressure to said heated portions of said strip and mandrel to selectively flatten and smooth only fibers protruding along the cross-sectional width of said strip surface portion; and
   (d) subsequently heat sealing adjacent edges of said strip after said heating and pressure steps to form a tubular support member having a smooth inner bore for a semi-permeable membrane.

2. A process as defined in claim 1, and further comprising the steps of
   (a) helically winding a second strip of fibrous material on said tubular support member;
   (b) heat sealing adjacent edges of said second strip to form a second outer tubular support member; and
   (c) connecting said second outer tubular support member with said tubular support member.

3. A process as defined in claim 1, wherein said heating step on said strip as it is wound on the mandrel comprises directing hot air from a hot air gun onto said adjacent surfaces of said strip and said mandrel.

4. A process as defined in claim 1, wherein said heating step is performed by an ultrasonic heater.

5. A process as defined in claim 1, wherein said heating step is performed by an electrical heater.

6. A process as defined in claim 1, wherein said heating step is performed by a radiant heater.

7. A process as defined in claim 1, wherein said heat sealing step comprises applying a heat seal adhesive.

8. A process as defined in claim 1, wherein said heat sealing step comprises welding said edges using an ultrasonic welder.

9. A process as defined in claim 1, wherein said fibrous material is porous and nonwoven.

* * * * *